(12) United States Patent
Rappl et al.

(10) Patent No.: US 9,902,008 B2
(45) Date of Patent: Feb. 27, 2018

(54) SYSTEMS AND METHODS FOR SELECTING A WELDING PROCESS

(71) Applicant: ILLINOIS TOOL WORKS INC., Glenview, IL (US)

(72) Inventors: James Francis Rappl, Neenah, WI (US); Jeffery Ray Ihde, Greenville, WI (US); Kenneth Austin Stanzel, Appleton, WI (US); John C. Leisner, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 237 days.

(21) Appl. No.: 14/537,147

(22) Filed: Nov. 10, 2014

(65) Prior Publication Data

US 2015/0136746 A1    May 21, 2015

Related U.S. Application Data

(60) Provisional application No. 61/905,570, filed on Nov. 18, 2013.

(51) Int. Cl.
| | | |
|---|---|---|
| *B23K 9/10* | (2006.01) | |
| *B23K 33/00* | (2006.01) | |
| *B23K 9/095* | (2006.01) | |
| *B23K 9/12* | (2006.01) | |
| *B23K 9/173* | (2006.01) | |

(52) U.S. Cl.
CPC ............ *B23K 9/0953* (2013.01); *B23K 9/124* (2013.01); *B23K 9/173* (2013.01)

(58) Field of Classification Search
CPC ......... B23K 9/0953; B23K 9/12–9/125; B23K 9/16–9/1735; B23K 9/00; B23K 9/06–9/0671; B23K 9/073–9/0737; B23K 9/09–9/093;
(Continued)

(56) References Cited

U.S. PATENT DOCUMENTS

| 7,205,503 B2 | 4/2007 | Reynolds | |
| 7,952,051 B2 * | 5/2011 | Veik | B23K 9/1068 |
| | | | 219/130.1 |

(Continued)

FOREIGN PATENT DOCUMENTS

| CN | 102369078 | 3/2012 |
| CN | 102699545 | 10/2012 |

(Continued)

OTHER PUBLICATIONS

International Search Report for PCT application No. PCT/US2014/065242, dated Jul. 15, 2015, 11 pgs.

*Primary Examiner* — Sang Y Paik
(74) *Attorney, Agent, or Firm* — McAndrews, Held & Malloy, Ltd.

(57) ABSTRACT

A method includes detecting whether a wire feeder is in communication with a welding power supply. The method also includes detecting a current welding process of the welding power supply if the wire feeder is in communication with the welding power supply. The method includes determining, at the wire feeder, a welding output polarity. The method also includes setting a new welding process based on the current welding process and the welding output polarity without a user selecting the new welding process.

20 Claims, 3 Drawing Sheets

(58) Field of Classification Search
CPC ..................................... B23K 9/1006–9/1037;
B23K 9/1043–9/1075; B23K 9/1081;
B23K 9/173
USPC ........ 219/130.1–130.51, 136, 137 R, 137 PS
See application file for complete search history.

(56) References Cited

U.S. PATENT DOCUMENTS

| | | | |
|---|---|---|---|
| 8,330,077 B2 | 12/2012 | Rappl | |
| 8,969,763 B2 * | 3/2015 | Furman | B23K 9/10 219/130.1 |
| 2005/0205543 A1 * | 9/2005 | Meckler | B23K 9/1336 219/137.71 |
| 2008/0087653 A1 | 4/2008 | Furman | |
| 2008/0149602 A1 * | 6/2008 | Lenzner | B23K 9/1068 219/121.45 |
| 2010/0108654 A1 * | 5/2010 | Ulrich | B23K 9/0953 219/130.5 |
| 2010/0276396 A1 * | 11/2010 | Cooper | B08B 15/04 219/74 |
| 2011/0049116 A1 * | 3/2011 | Rappl | B23K 9/1006 219/132 |
| 2012/0097644 A1 | 4/2012 | Ott | |
| 2012/0241428 A1 | 9/2012 | Kowaleski | |
| 2013/0256289 A1 | 10/2013 | Knoener | |
| 2013/0319987 A1 | 12/2013 | Beistle | |
| 2013/0327751 A1 | 12/2013 | Salsich | |
| 2013/0327753 A1 | 12/2013 | Roth | |
| 2014/0339202 A1 | 11/2014 | Romenesko | |

FOREIGN PATENT DOCUMENTS

| | | |
|---|---|---|
| CN | 102708263 | 10/2012 |
| CN | 102744494 | 10/2012 |
| DE | 102012011637 | 8/2013 |
| JP | 2013154913 | 8/2013 |

* cited by examiner

SYSTEMS AND METHODS FOR SELECTING A WELDING PROCESS

CROSS-REFERENCE TO RELATED APPLICATIONS

This application claims priority from and the benefit of U.S. Provisional Application Ser. No. 61/905,570, entitled "SYSTEMS AND METHODS FOR SELECTING A WELDING PROCESS," filed Nov. 18, 2013, which is hereby incorporated by reference in its entirety for all purposes.

BACKGROUND

The invention relates generally to welding systems, and, more particularly, to systems and methods for selecting a welding process.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A power source ensures that arc heating is available to melt the filler metal and the underlying base metal.

In certain applications, a welding operator may switch between a wire process mode (e.g., flux-cored arc welding (FCAW) with or without gas, MIG welding, etc.) and a non-wire process mode (e.g., stick welding, tungsten inert gas (TIG) welding, etc.). To switch between the wire and non-wire process modes, the welding operator may connect and/or disconnect a wire feeder from being coupled to the welding power supply. When switching between wire and non-wire process modes, it may be difficult for the welding operator to properly select the correct process mode. For example, the welding operator may not be physically located near the welding power supply and/or the welding operator may not know whether welding cables are connected to the welding power supply for direct current electrode negative (DCEN) or for direct current electrode positive (DCEP).

BRIEF DESCRIPTION

In one embodiment, a method includes detecting whether a wire feeder is in communication with a welding power supply. The method also includes detecting a current welding process of the welding power supply if the wire feeder is in communication with the welding power supply. The method includes determining, at the wire feeder, a welding output polarity. The method also includes setting a new welding process based on the current welding process and the welding output polarity without a user selecting the new welding process.

In another embodiment, an article of manufacture includes one or more tangible, non-transitory machine-readable media having encoded thereon processor-executable instructions. The instructions include instructions to detect whether a wire feeder is in communication with a welding power supply. The instructions also include instructions to detect a current welding process of the welding power supply if the wire feeder is in communication with the welding power supply. The instructions include instructions to determine a welding output polarity. The instructions also include instructions to set a new welding process based on the current welding process and the welding output polarity.

In another embodiment, a welding system includes a welding power supply configured to provide welding power for a welding application. The welding system also includes a wire feeder configured to determine a welding output polarity. At least one of the welding power supply and the wire feeder are configured to detect whether the wire feeder is in communication with the welding power supply, to detect a current welding process of the welding power supply if the wire feeder is in communication with the welding power supply, and to set a new welding process based on the current welding process and the welding output polarity without a user selecting the new welding process.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
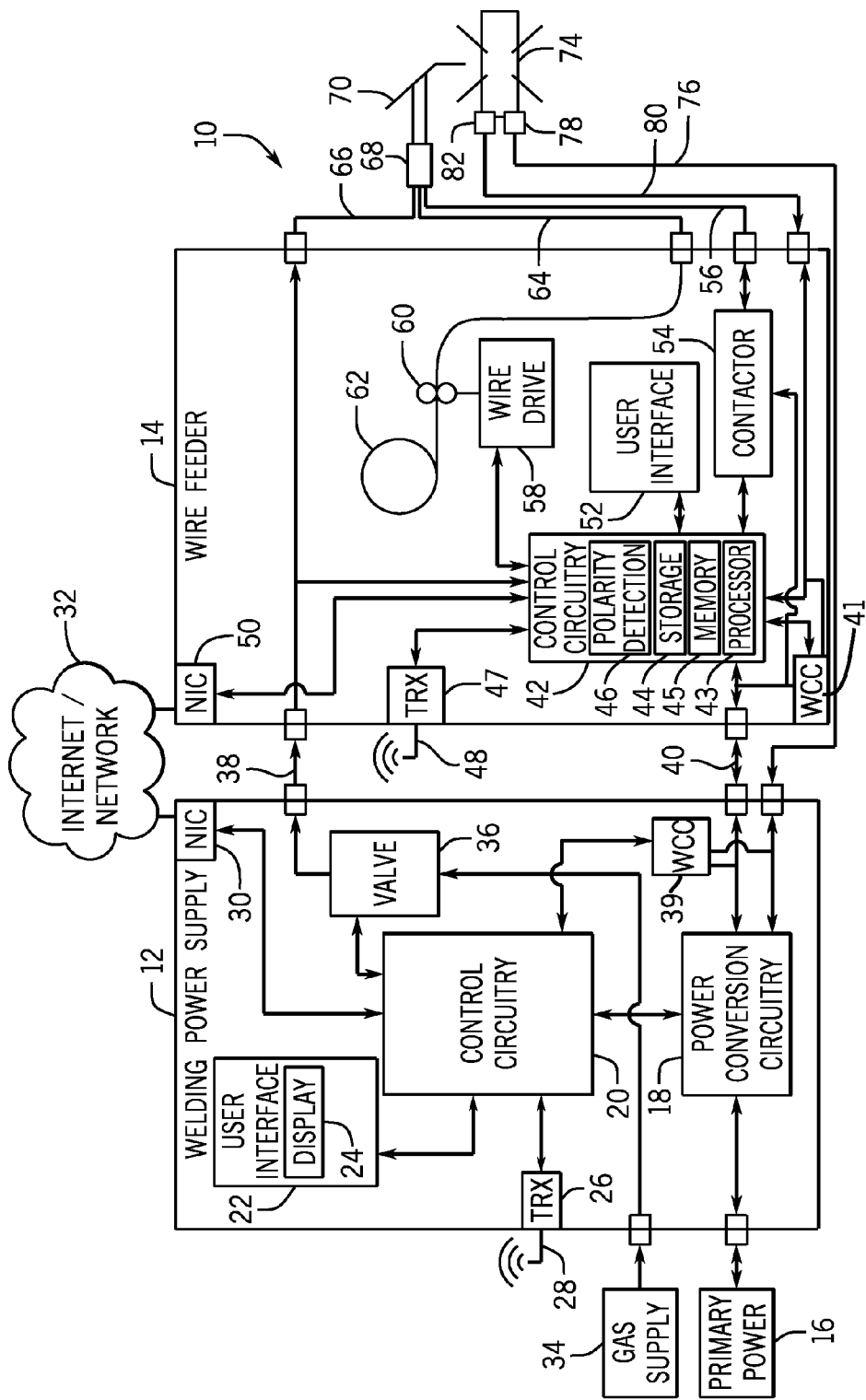
FIG. 1 is a block diagram of an embodiment of a welding system employing a wire feeder having polarity detection circuitry, in accordance with aspects of the present disclosure.

Turning now to the drawings, FIG. 1 is a block diagram of an embodiment of a welding system 10 employing a wire feeder having polarity detection circuitry. In the illustrated embodiment, the welding system 10 is a flux-cored arc welding (FCAW) welding system, although the present techniques may be used on other welding systems, such as other gas metal arc welding (GMAW) systems, and so forth. The welding system 10 powers, controls, and supplies consumables to a welding application. The welding system 10 includes a welding power supply 12 and a voltage sensing wire feeder 14.

The welding power supply 12 receives primary power 16 (e.g., from the AC power grid, an engine/generator set, a battery, or other energy generating or storage devices, or a combination thereof), conditions the primary power, and provides an output power to one or more welding devices in accordance with demands of the system 10. The primary power 16 may be supplied from an offsite location (i.e., the primary power may originate from the power grid). Accordingly, the welding power supply 12 includes power conversion circuitry 18 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 18 may be configured to convert the primary power 16 to both weld and auxiliary power outputs. However, in other embodiments, the power conversion circuitry 18 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 20 to control the operation of the welding power supply 12. The welding power supply 12 also includes a user interface 22. The control circuitry 20 may receive input from the user interface 22 through which a user may choose a process and input desired parameters (e.g., voltages, currents, particular pulsed or non-pulsed welding regimes, and so forth). The user interface 22 may receive inputs using any input device, such as via a keypad, keyboard, buttons, touch screen, voice activation system, wireless device, etc. Furthermore, the control circuitry 20 may control parameters input by the user as well as any other parameters. Specifically, the user interface 22 may include a display 24 for presenting, showing, or indicating, information to an operator. The control circuitry 20 may also include interface circuitry for communicating data to other devices in the system 10, such as the voltage sensing wire feeder 14. The welding power supply 12 includes a transceiver 26 for wirelessly communicating 28 with other welding devices. In the illustrated embodiments, the welding power supply 12 may communicate with other welding devices using a wired connection, such as by using a network interface controller (NIC) 30 to communicate data via a network 32 (e.g., the Internet).

A gas supply 34 provides shielding gases, such as argon, helium, carbon dioxide, and so forth, depending upon the welding application. The shielding gas flows to a valve 36, which controls the flow of gas, and if desired, may be selected to allow for modulating or regulating the amount of gas supplied to a welding application. The valve 36 may be opened, closed, or otherwise operated by the control circuitry 20 to enable, inhibit, or control gas flow through the valve 36. For example, when the valve 36 is closed, shielding gas may be inhibited from flowing through the valve 36. Conversely, when the valve 36 is opened, shielding gas may be enabled to flow through the valve 36. In certain embodiments, the welding system 10 may control the valve 36 such that data is communicated from the welding power supply 12 to the voltage sensing wire feeder 14 using data encoded within gas flow fluctuations (e.g., via gas pulses within the flow of gas). Shielding gas exits the valve 36 and flows through a cable or hose 38 (which in some implementations may be packaged with the welding power output) to the voltage sensing wire feeder 14 which provides the shielding gas to the welding application. As may be appreciated, certain embodiments of the welding system 10 may not include the gas supply 34, the valve 36, and/or the hose 38.

Welding power flows through a cable 40 to the voltage sensing wire feeder 14. The voltage sensing wire feeder 14 uses the welding power to power the various components in the voltage sensing wire feeder 14, such as to power control circuitry 42. The welding power supply 12 may also communicate with the voltage sensing wire feeder 14 using the cable 40. For example, the welding power supply 12 and/or the voltage sensing wire feeder 14 may use weld cable communication (WCC) in which data is provided over the welding power such that welding power and data are provided together using a single conductor. WCC may be implemented as described in U.S. patent application Ser. No. 12/912,452 which is hereby incorporated by reference in its entirety. Furthermore, the WCC may be implemented using any suitable power line communication method. Accordingly, the welding power supply 12 includes WCC circuitry 39, and the wire feeder 14 includes WCC circuitry 41 to facilitate communication using WCC between the welding power supply 12 and the wire feeder 14. Thus, using a single cable 40, welding power may be provided from the welding power supply 12 to the voltage sensing wire feeder 14, and the welding power supply 12 may communicate with the voltage sensing wire feeder 14.

The control circuitry 42 controls the operations of the voltage sensing wire feeder 14. The control circuitry 42 includes at least one controller or processor 43 that controls the operations of the voltage sensing wire feeder 14, and may be configured to receive and process multiple inputs regarding the performance and demands of the system 10. Furthermore, the processor 43 may include one or more microprocessors, such as one or more "general-purpose" microprocessors, one or more special-purpose microprocessors and/or ASICS, or some combination thereof. For example, the processor 43 may include one or more reduced instruction set (RISC) processors.

The control circuitry 42 may include a storage device 44 and a memory device 45. The storage device 44 (e.g., nonvolatile storage) may include ROM, flash memory, a hard drive, or any other suitable optical, magnetic, or solid-state storage medium, or a combination thereof. The storage device 44 may store data (e.g., data corresponding to a welding application, etc.), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 45 may include a volatile memory, such as random access memory (RAM), and/or a nonvolatile memory, such as read-only memory (ROM). The memory device 45 may store a variety of information and may be used for various purposes. For example, the memory device 45 may store processor-executable instructions (e.g., firmware or software) for the processor 43 to execute. In addition, a variety of control regimes for various welding processes, along with associated settings and parameters, may be stored in the storage device 44 and/or memory device 45, along with code configured to provide a specific output (e.g., initiate wire feed, enable gas flow, capture welding current data, detect short circuit parameters, determine amount of spatter, etc.) during operation.

The control circuitry 42 includes polarity detection circuitry 46 configured to detect whether the voltage sensing wire feeder 14 is connected to the welding power supply 12 for direct current electrode negative (DCEN) welding or for direct current electrode positive (DCEP) welding. As may be appreciated, the polarity detection circuitry 46 may use one or more diodes, transistors, switches, voltage monitors, current monitors, or any other suitable electronic device for determining the welding output polarity. As described herein, in certain embodiments, the voltage sensing wire feeder 14 may use the control circuitry 42 to detect whether the voltage sensing wire feeder 14 is in communication with the welding power supply 12, to detect a current welding process of the welding power supply 12 if the voltage sensing wire feeder 14 is in communication with the welding power supply 12, to determine a welding output polarity (e.g., DCEN, DCEP, etc.), and to set a new welding process based on the current welding process and the welding output polarity without a user selecting the new welding process (e.g., automatically, without user intervention). Furthermore, in other embodiments, the voltage sensing wire feeder 14 may be configured to determine the welding output polarity, and at least one of the welding power supply 12 and the voltage sensing wire feeder 14 may use the control circuitry 20 or 42 to detect whether the voltage sensing wire feeder 14 is in communication with the welding power supply 12, to detect a current welding process of the welding power supply 12 if the voltage sensing wire feeder 14 is in communication with the welding power supply 12, and to set a new welding process based on the current welding process and the welding output polarity without a user selecting the new welding process (e.g., automatically, without user intervention).

In certain embodiments, the voltage sensing wire feeder 14 also includes a transceiver 47 for wirelessly communicating 48 with the welding power supply 12, or another device (e.g., either directly or through a network). In certain embodiments, the transceiver 47 may be a Bluetooth device configured to communicate wirelessly with other devices. Moreover, the transceiver 47 may be used to transmit and/or receive data logs, error codes, error information, or any other suitable data. In the illustrated embodiment, the voltage sensing wire feeder 14 may communicate with other welding devices using a wired connection, such as by using a NIC 50 to communicate data via the network 32. Moreover, the voltage sensing wire feeder 14 may communicate via the network 32 using a wireless connection.

The voltage sensing wire feeder 14 includes a user interface 52. The control circuitry 42 may receive input from the user interface 52, such as via methods and devices described in relation to the user interface 22. Moreover, the user interface 52 may include one or more buttons, touch screens, switches, etc. for enabling an operator to select one of the weld procedure memories. Furthermore, the control circuitry 42 may display information (e.g., on a display of the user interface 52) to an operator, such as voltage, current, wire speed, wire type, and so forth. A contactor 54 (e.g., high amperage relay) is controlled by the control circuitry 42 and configured to enable or inhibit welding power to flow to a weld power cable 56 for the welding application. In certain embodiments, the contactor 54 may be an electromechanical device, while in other embodiments the contactor 54 may be any other suitable device, such as a solid state device. The voltage sensing wire feeder 14 includes a wire drive 58 that receives control signals from the control circuit 42 to drive rollers 60 that rotate to pull wire off a spool 62 of wire. The wire is provided to the welding application through a cable 64. Likewise, the voltage sensing wire feeder 14 may provide shielding gas through a cable 66. As may be appreciated, the cables 56, 64, and 66 may be bundled together with a coupling device 68.

A torch 70 delivers the wire, welding power, and shielding gas for a welding application. The torch 70 is used to establish a welding arc between the torch 70 and a workpiece 74. A work cable 76, which may be terminated with a clamp 78 (or another power connecting device), couples the welding power supply 12 to the workpiece 74 to complete a welding power circuit. As illustrated, a voltage sense cable 80 is coupled from the voltage sensing wire feeder 14 to the workpiece 74 using a sense clamp 82 (or another power connecting mechanism). Accordingly, the voltage sensing wire feeder 14 is connected to the welding power supply 12 so that it may operate even when a welding arc is not formed by the torch 70. Specifically, the voltage sensing wire feeder 14 receives welding power from the welding power supply 12 through cable 40. The welding power is connected to the various components in the voltage sensing wire feeder 14 (e.g., control circuitry 42, wire drive 58, user interface 52). A return path for the voltage sensing wire feeder 14 power is formed using the voltage sense cable 80 with the sense clamp 82 connected to the workpiece 74. Further, the work cable 76 with the work clamp 78 provide the final portion of the return path to the welding power supply 12. Thus, the return path includes the cable 80, the workpiece 74, and the cable 76. As may be appreciated, welding power may flow in either direction through the conductive path formed by cables 40, 56, and 76.

Figure 2:
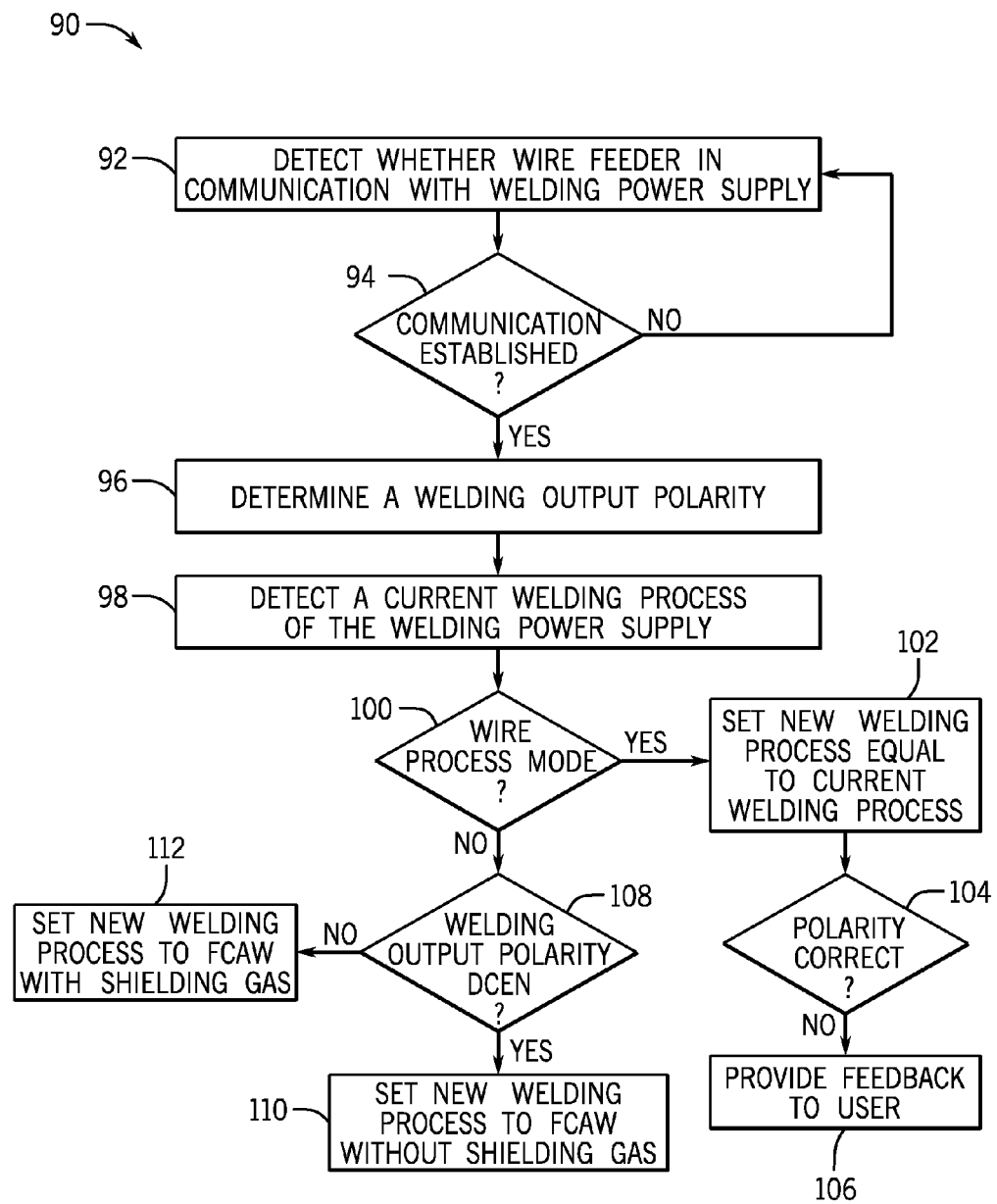
FIG. 2 is a flow chart of an embodiment of a method for selecting a new welding process, in accordance with aspects of the present disclosure.

FIG. 2 is a flow chart of an embodiment of a method 90 for selecting a new welding process. The welding power supply 12 and/or the voltage sensing wire feeder 14 detects whether the voltage sensing wire feeder 14 is in communication with the welding power supply 12 (block 92). As may be appreciated, the voltage sensing wire feeder 14 may use the WCC circuitry 41, the control circuitry 42, the NIC 50, the transceiver 47, and/or any other suitable device to detect whether the voltage sensing wire feeder 14 is in communication with the welding power supply 12. Furthermore, the welding power supply may use the WCC circuitry 39, the control circuitry 20, the NIC 30, the transceiver 26, and/or any other suitable device to detect whether the welding power supply 12 is in communication with the voltage sensing wire feeder 14. If communication between the voltage sensing wire feeder 14 and the welding power supply 12 is not established (block 94), the method returns to block 92. However, if communication between the voltage sensing wire feeder 14 and the welding power supply 12 is established, the voltage sensing wire feeder 14 determines a welding output polarity (block 96). For example, the voltage sensing wire feeder 14 uses the polarity detection circuitry 46 to determine whether the welding output polarity is DCEP or DCEN. As may be appreciated, the welding power supply 12 and/or the voltage sensing wire feeder 14 may use the welding output polarity to set the new welding process based on a current welding process and without a user selecting the new welding process (e.g., automatically, without user intervention).

Accordingly, the welding power supply 12 and/or the voltage sensing wire feeder 14 detects the current welding process of the welding power supply 12 (block 98). For example, the welding power supply 12 and/or the voltage sensing wire feeder 14 may detect whether the welding power supply 12 is set to stick welding, tungsten inert gas (TIG) welding, FCAW no gas, and/or FCAW with gas, and so forth. Moreover, the welding power supply 12 and/or the voltage sensing wire feeder 14 may determine if the current welding process is a wire process mode (e.g., FCAW no gas, FCAW with gas, etc.) (block 100). If the current welding process is a wire process mode, the welding power supply 12 and/or the voltage sensing wire feeder 14 may instruct the welding power supply 12 to not change the current welding process (e.g., set the new welding process equal to the current welding process) (block 102). Furthermore, the welding power supply 12 and/or the voltage sensing wire feeder 14 may determine whether the welding output polarity is correct for the current welding process (block 104). In certain embodiments, the welding output polarity may be correct for the current welding process if the welding output polarity is DCEN and the current welding process is FCAW without shielding gas. Moreover, in certain embodiments, the welding output polarity may be correct for the current welding process if the welding output polarity is DCEP and the current welding process is FCAW with shielding gas.

If the welding output polarity is not correct, the welding power supply 12 and/or the voltage sensing wire feeder 14 may provide feedback to the welding operator indicating that the welding output polarity is not correct for the current welding process (block 106). For example, the user interface 22 of the welding power supply 12 and/or the user interface 52 of the voltage sensing wire feeder 14 may display information indicating that the welding output polarity is not correct for the current welding process. In certain embodiments, the welding output polarity may be incorrect for the current welding process if the welding output polarity is DCEP and the current welding process is FCAW without shielding gas. Moreover, in certain embodiments, the welding output polarity may be incorrect for the current welding process if the welding output polarity is DCEN and the current welding process is FCAW with shielding gas.

If the current welding process is not a wire process mode, the welding power supply 12 and/or the voltage sensing wire feeder 14 may determine whether the welding output polarity is DCEN (block 108). If the welding output polarity is DCEN, the welding power supply 12 and/or the voltage sensing wire feeder 14 may instruct the welding power supply 12 to change the current welding process to FCAW without shielding gas (e.g., set the new welding process to FCAW without shielding gas) (block 110). However, if the welding output polarity is DCEP (e.g., not DCEN), the welding power supply 12 and/or the voltage sensing wire feeder 14 may instruct the welding power supply 12 to change the current welding process to FCAW with shielding gas (e.g., set the new welding process to FCAW with shielding gas) (block 112).

Figure 3:
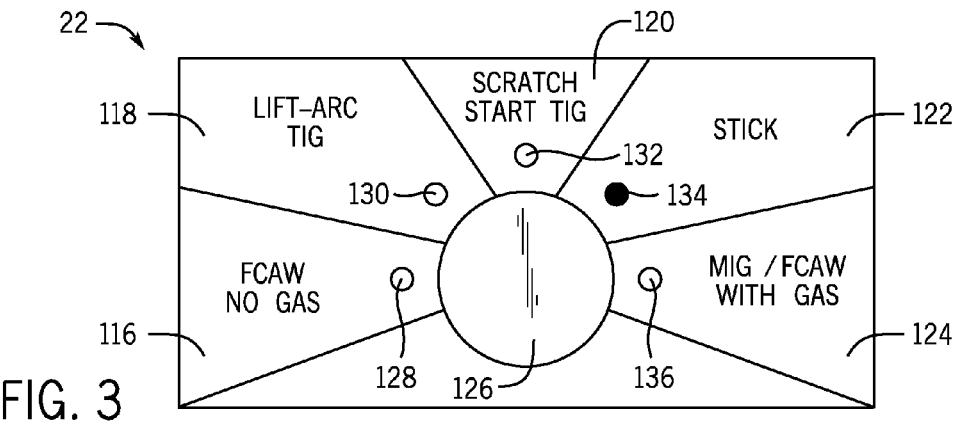
FIG. 3 is a diagram of an embodiment of a user interface of a welding power supply with stick welding mode selected, in accordance with aspects of the present disclosure.
Figure 4:
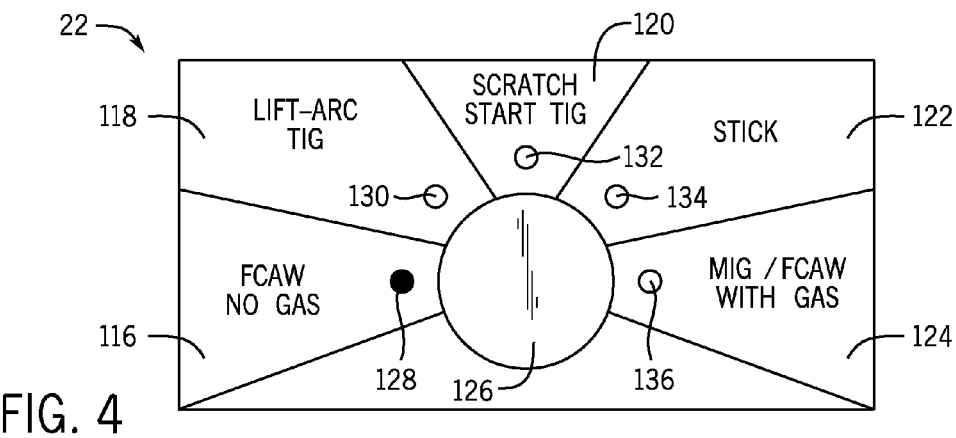
FIG. 4 is a diagram of an embodiment of a user interface of a welding power supply with flux-cored arc welding (FCAW) no gas mode selected, in accordance with aspects of the present disclosure.
Figure 5:
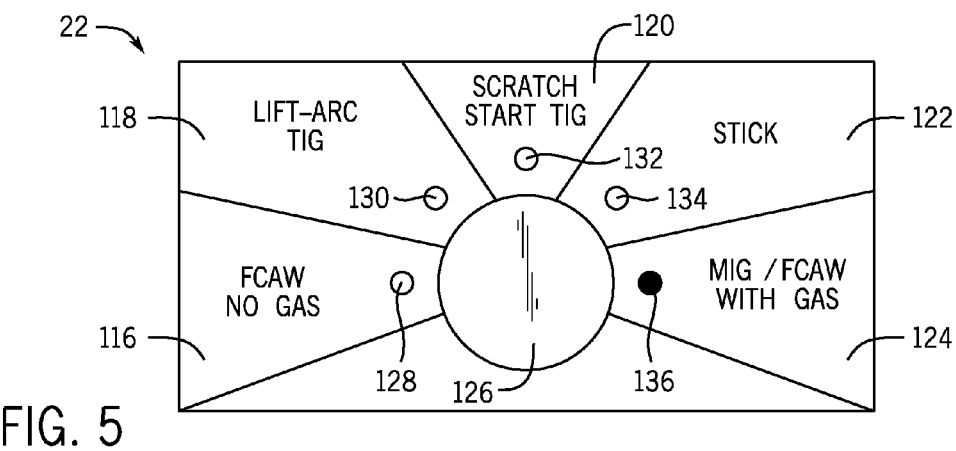
FIG. 5 is a diagram of an embodiment of a user interface of a welding power supply with FCAW with gas mode selected, in accordance with aspects of the present disclosure.

FIG. 3 is a diagram of an embodiment of the user interface 22 of the welding power supply 12 with stick welding mode selected. Specifically, in the illustrated embodiment, the user interface 22 includes the following process selections: FCAW no gas welding 116, lift-arc TIG welding 118, scratch start TIG welding 120, stick welding 122, and MIG/FCAW with gas welding 124. A user input device 126 may be used by a welding operator to select a desired welding process. Moreover, indicators 128, 130, 132, 134, and 136 are used to show which process is selected. In the illustrated embodiment, stick welding 122 is selected as shown by the indicator 134. As discussed above, the welding operator may switch from stick welding 122 to a wire process mode by adding the voltage sensing wire feeder 14 into the welding system 10 including having the voltage sensing wire feeder 14 connected to the welding power supply 12. A wire process is automatically selected by the welding system 10 based on the welding output polarity without the welding operator making a new process selection (e.g., without user intervention). For example, if the welding output polarity is DCEN, FCAW no gas welding 116 is selected automatically (e.g., without user intervention) by the welding system 10 as illustrated by the indicator 128 in FIG. 4. As another example, if the welding output polarity is DCEP, MIG/FCAW with gas welding 124 is selected automatically (e.g., without user intervention) by the welding system 10 as illustrated by the indicator 136 in FIG. 5. Thus, a wire process may be selected by the welding system 10 when switching from a non-wire process mode to a wire-process mode after reconfiguring the welding system 10. When switching back to a non-wire process mode from a wire process mode, the welding system 10 may automatically (e.g., without the welding operator making a selection, without user intervention) return the welding power supply 12 to the previously used non-wire process mode.

As may be appreciated, by using the method 90 described herein, a correct process mode may be selected with little to no process selection made on the welding power supply 12 by the welding operator. For example, a welding operator physically located away from a welding power supply may have a correct process mode selected without the welding operator making the selection (e.g., the selection is made by the welding system 10 after changing the welding configuration from a non-wire process mode to a wire-process mode).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   detecting whether a wire feeder is in communication with a welding power supply;
   detecting a current welding process of the welding power supply if the wire feeder is in communication with the welding power supply;
   determining, via polarity detection circuitry of the wire feeder, a welding output polarity; and
   setting a new welding process based on both the current welding process detected from the welding power supply and the welding output polarity determined by the polarity detection circuitry of the wire feeder without a user selecting the new welding process.

2. The method of claim 1, wherein setting the new welding process based on the current welding process and the welding output polarity comprises:
   determining whether the current welding process is a wire process mode; and
   setting the new welding process to the current welding process if the current welding process is the wire process mode.

3. The method of claim 2, comprising determining whether the welding output polarity is correct if the current welding process is the wire process mode.

4. The method of claim 3, comprising providing feedback to the user if the welding output polarity is incorrect.

5. The method of claim 1, wherein setting the new welding process based on the current welding process and the welding output polarity comprises:
   determining whether the current welding process is a wire process mode; and
   setting the new welding process to flux-cored arc welding (FCAW) without shielding gas if the current welding process is not the wire process mode and if the welding output polarity is direct current electrode negative (DCEN).

6. The method of claim 1, wherein setting the new welding process based on the current welding process and the welding output polarity comprises:
   determining whether the current welding process is a wire process mode; and setting the new welding process to flux-cored arc welding (FCAW) with shielding gas if the current welding process is not the wire process mode and if the welding output polarity is direct current electrode positive (DCEP).

7. The method of claim 1, wherein the wire feeder is configured to communicate with the welding power supply over a weld cable.

8. The method of claim 1, wherein the wire feeder is configured to communicate with the welding power supply using a wireless or network interface.

9. The method of claim 1, wherein the wire feeder is a voltage sensing wire feeder.

10. The method of claim 1, comprising combining welding power and data from the welding power supply and providing the combined welding power and data to the wire feeder, wherein the combined welding power and data enables communication between the wire feeder and the welding power supply.

11. An article of manufacture comprising:
one or more tangible, non-transitory machine-readable media having encoded thereon processor-executable instructions, the instructions comprising:
instructions to detect whether a wire feeder is in communication with a welding power supply;
instructions to detect a current welding process of the welding power supply if the wire feeder is in communication with the welding power supply;
instructions to determine a welding output polarity via polarity detection circuitry of the wire feeder; and
instructions to set a new welding process based on both the current welding process detected from the welding power supply and the welding output polarity determined via the polarity detection circuitry of the wire feeder.

12. The article of manufacture of claim 11, wherein the instructions to set the new welding process based on the current welding process and the welding output polarity comprise:
instructions to determine whether the current welding process is a wire process mode; and
instructions to set the new welding process to the current welding process if the current welding process is the wire process mode.

13. The article of manufacture of claim 12, wherein the instructions comprise instructions to determine whether the welding output polarity is correct if the current welding process is the wire process mode.

14. The article of manufacture of claim 13, wherein the instructions comprise instructions to provide feedback if the welding output polarity is incorrect.

15. The article of manufacture of claim 11, wherein the instructions to set the new welding process based on the current welding process and the welding output polarity comprise:
instructions to determine whether the current welding process is a wire process mode; and
instructions to set the new welding process to flux-cored arc welding (FCAW) without shielding gas if the current welding process is not the wire process mode and if the welding output polarity is direct current electrode negative (DCEN).

16. The article of manufacture of claim 11, wherein the instructions to set the new welding process based on the current welding process and the welding output polarity comprise:
instructions to determine whether the current welding process is a wire process mode; and
instructions to set the new welding process to flux-cored arc welding (FCAW) with shielding gas if the current welding process is not the wire process mode and if the welding output polarity is direct current electrode positive (DCEP).

17. The article of manufacture of claim 11, wherein the instructions to set the new welding process based on the current welding process and the welding output polarity comprise:
instructions to determine whether the current welding process is a wire process mode;
instructions to set the new welding process to the current welding process if the current welding process is the wire process mode;
instructions to set the new welding process to flux-cored arc welding (FCAW) without shielding gas if the current welding process is not the wire process mode and if the welding output polarity is direct current electrode negative (DCEN); and
instructions to set the new welding process to FCAW with shielding gas if the current welding process is not the wire process mode and if the welding output polarity is direct current electrode positive (DCEP).

18. A welding system comprising:
a welding power supply configured to provide welding power for a welding application; and
a wire feeder comprising polarity detection circuitry configured to determine a welding output polarity;
wherein at least one of the welding power supply and the wire feeder are configured to detect whether the wire feeder is in communication with the welding power supply, to detect a current welding process of the welding power supply if the wire feeder is in communication with the welding power supply, and to set a new welding process based on both the current welding process of the welding power supply and the welding output polarity determined by the polarity detection circuitry of the wire feeder without a user selecting the new welding process.

19. The welding system of claim 18, wherein the at least one of the welding power supply and the wire feeder is configured to determine whether the current welding process is a wire process mode, to set the new welding process to the current welding process if the current welding process is the wire process mode, to set the new welding process to flux-cored arc welding (FCAW) without shielding gas if the current welding process is not the wire process mode and if the welding output polarity is direct current electrode negative (DCEN), and to set the new welding process to FCAW with shielding gas if the current welding process is not the wire process mode and if the welding output polarity is direct current electrode positive (DCEP).

20. The welding system of claim 18, wherein the wire feeder is configured to communicate with the welding power supply over a weld cable.

* * * * *